United States Patent
Youk et al.

(10) Patent No.: US 9,746,724 B2
(45) Date of Patent: Aug. 29, 2017

(54) LIQUID CRYSTAL DISPLAY

(71) Applicant: Samsung Display Co., Ltd., Yongin-si, Gyeonggi-do (KR)

(72) Inventors: Ki Kyung Youk, Bucheon-si (KR); Hyun-Ho Kang, Ansan-si (KR); O Sung Seo, Seoul (KR); Seung Jun Yu, Cheonan-si (KR); Ha Won Yu, Suwon-si (KR); Yeo Geon Yoon, Suwon-si (KR); Sang-Myoung Lee, Seoul (KR); Tae Kyung Yim, Seoul (KR)

(73) Assignee: Samsung Display Co., Ltd. (KR)

( * ) Notice: Subject to any disclaimer, the term of this patent is extended or adjusted under 35 U.S.C. 154(b) by 1 day.

(21) Appl. No.: 14/844,811

(22) Filed: Sep. 3, 2015

(65) Prior Publication Data
US 2016/0202575 A1    Jul. 14, 2016

(30) Foreign Application Priority Data

Jan. 9, 2015 (KR) ........................ 10-2015-0003663

(51) Int. Cl.
*G02F 1/1343* (2006.01)
*G02F 1/1362* (2006.01)
*G02F 1/1337* (2006.01)

(52) U.S. Cl.
CPC .. *G02F 1/134336* (2013.01); *G02F 1/136286* (2013.01); *G02F 1/13624* (2013.01); *G02F 1/133707* (2013.01); *G02F 2001/134345* (2013.01); *G02F 2201/52* (2013.01)

(58) Field of Classification Search
CPC ......... G02F 1/134336; G02F 1/136286; G02F 2001/134354; G02F 2201/52
See application file for complete search history.

(56) References Cited

U.S. PATENT DOCUMENTS

2004/0233364 A1* 11/2004 Yamahara ......... G02F 1/133634
349/118
2012/0306935 A1* 12/2012 Jeong, II ............ H04N 13/0434
345/690

FOREIGN PATENT DOCUMENTS

KR   10-2008-0058908 A   6/2008
KR   10-2009-0131842 A   12/2009
KR   10-2012-0005753 A   1/2012

* cited by examiner

*Primary Examiner* — Dung Nguyen
(74) *Attorney, Agent, or Firm* — Innovation Counsel LLP

(57) ABSTRACT

A liquid crystal display device includes a display panel including: a lower display substrate on which a plurality of pixel electrodes are disposed in a matrix and data lines extend in a column direction between adjacent pixel electrodes; an upper display substrate on which a common electrode is disposed; and a liquid crystal layer disposed between the lower display substrate and the upper display substrate and including liquid crystal molecules. The display panel includes a plurality of unit pixels, each unit pixel including pixels having different colors, and each pixel including one of the pixel electrodes. A gap between neighboring unit pixels is larger than a gap between neighboring pixel electrodes within each unit pixel, and a data line positioned between the neighboring unit pixels has a portion having a width larger than that of a data line positioned between the neighboring pixel electrodes within each unit pixel.

13 Claims, 14 Drawing Sheets

LIQUID CRYSTAL DISPLAY

CROSS-REFERENCE TO RELATED APPLICATION

This application claims priority to and the benefit of Korean Patent Application No. 10-2015-0003663 filed in the Korean Intellectual Property Office on Jan. 9, 2015, the entire contents of which are incorporated herein by reference.

BACKGROUND (a) Technical Field

The present invention relates to a liquid crystal display.

(b) Description of the Related Art

Liquid crystal displays (LCD) are currently one of most widely used flat panel displays (FPDs). Liquid crystal displays include two display substrates and a liquid crystal layer interposed therebetween. The display substrates include field generating electrodes such as a pixel electrode, a common electrode, and the like, formed thereon. In an LCD, a voltage is applied to a field generating electrode to generate an electric field in a liquid crystal layer, whereby orientation of liquid crystal molecules of the liquid crystal layer is determined and polarization of incident light is controlled to display an image.

Among LCDs is a vertically aligned mode LCD in which liquid crystal modules are aligned such that a longer axis thereof is perpendicular to a display panel in a state in which a field is not applied. In order to secure a wide viewing angle, the vertically aligned mode LCD uses a scheme of forming a cutout portion such as a fine slit, or the like, in a field generating electrode to form a plurality of domains in which liquid crystal molecules are controlled to be oriented in different directions, or the like. Also, in order to make lateral visibility approximate to front visibility, a method of dividing a single subpixel into two sections and applying different voltages thereto to differentiate transmittance has been proposed.

Recently, LCDs have been increased in size, and curved display panels that increase the engagement (or immersion) and presence of viewers have been developed. LCDs employing such a curved display panel have emerged. However, in a curved display panel, a lower display substrate and an upper display substrate may be misaligned, generating texture to due to interference between adjacent pixels to limit a reduction in a width of a light blocking member.

The above information disclosed in this Background section is only for enhancement of understanding of the background of the disclosure and therefore it may contain information that does not form the prior art that is already known to a person of ordinary skill in the art.

SUMMARY

A liquid crystal display device having excellent display quality is provided.

A liquid crystal display device having advantages of reducing texture generated as lower and upper display substrates are misaligned in a curved display panel and preventing generation of spots due to a coupling effect based on capacitance between a pixel electrode and a data line is also provided.

In one aspect, a liquid crystal display device includes a display panel including: a lower display substrate on which a plurality of pixel electrodes are disposed in a matrix and data lines extend in a column direction between adjacent pixel electrodes; an upper display substrate on which a common electrode is disposed; and a liquid crystal layer disposed between the lower display substrate and the upper display substrate and including liquid crystal molecules. The display panel includes a plurality of unit pixels, each unit pixel including pixels having different colors, and each pixel including one pixel electrode of the plurality of pixel electrodes. A gap between neighboring unit pixels is larger than a gap between neighboring pixel electrodes within the same unit pixel, and a data line positioned between the neighboring unit pixels has a portion having a width larger than that of a data line positioned between the neighboring pixel electrodes within each unit pixel.

A distance between a left data line and a pixel electrode adjacent to the data line positioned between the neighboring unit pixels and a distance between a right data line and the pixel electrode may be substantially equal.

The portion having a larger width of the data line positioned in the boundary between the neighboring unit pixels may have a ring shape with both ends rounded.

The portion having a larger width of the data line positioned in the boundary between the neighboring unit pixels may have a ring shape with both ends angular.

The portion having a larger width of the data line positioned in the boundary between the neighboring unit pixels may be formed as a solid body.

The portion having a larger width of the data line positioned in the boundary between the neighboring unit pixels may be continuously formed across the plurality of pixel electrodes in a column direction.

The portion having a larger width of the data line positioned in the boundary between the neighboring unit pixels may be formed to be discontinuous at every portion between the pixels.

Each pixel electrode may include a first subpixel electrode and a second subpixel electrode, each of the first and second subpixel electrodes may include a plurality of subregions in which tilting directions of liquid crystal molecules may be differently controlled, and directions in which the liquid crystal molecules are controlled may be substantially the same in the corresponding subregions of the pixel electrodes within each unit pixel.

Directions in which the liquid crystal molecules are controlled may be substantially opposite in corresponding subregions of the pixel electrodes adjacent to the boundary between the neighboring unit pixels.

The first subpixel electrode may include first, second, third, and fourth subregions sequentially from an upper side, and a direction in which the liquid crystal molecules are controlled in the first and second subregions and a direction in which the liquid crystal molecules are controlled in the third and fourth subregions may be substantially opposite.

The second subpixel electrode may include first, second, third, and fourth subregions sequentially from an upper side, and a direction in which the liquid crystal molecules are controlled in the first and second subregions and a direction in which the liquid crystal molecules are controlled in the third and fourth subregions may be substantially opposite.

A direction in which the liquid crystal molecules are controlled in the first and second subregions of the first subpixel electrode and a direction in which the liquid crystal molecules are controlled in the first and second subregions of the second subpixel electrode may be substantially the same.

Each of the first subpixel electrode and the second subpixel electrode may include an upper electrode and a lower electrode connected to each other, each of the upper electrode and the lower electrode each may include a horizontal stem portion, a vertical stem portion, and a plurality of fine branch portions slantingly extending from the horizontal stem portion or the vertical stem portion, and the horizontal stem portion forms the boundary between two neighboring subregions.

In another aspect, a liquid crystal display device includes a display panel including: a lower display substrate on which a plurality of pixel electrodes are disposed in a matrix and data lines extend in a column direction between adjacent pixel electrodes; an upper display substrate on which a common electrode is disposed; and a liquid crystal layer disposed between the lower display substrate and the upper display substrate and including liquid crystal molecules. The display panel may include a plurality of unit pixels, each unit pixel including pixels having different colors, and each pixel including one pixel electrode of the plurality of pixel electrodes, a gap between pixel electrodes adjacent to the boundary between unit pixels neighboring in a row direction is larger than a gap between neighboring pixel electrodes within each unit pixel, and a wing is connected to a side, which is adjacent to the boundary, of the pixel electrode that is adjacent to the boundary.

A distance between the pixel electrode adjacent to the boundary and a data line adjacent to a side of the pixel electrode where the wing is not connected and a distance between the wing connected to the pixel electrode and the data line positioned in the boundary may be substantially equal.

One wing adjacent to the boundary may be connected to the pixel electrode.

A plurality of wings may be connected to the pixel electrode adjacent to the boundary.

The wing may be formed to be substantially parallel to the data line positioned in the boundary.

The wing may be formed on the same layer as that of the pixel electrode, and may be formed of the same material as that of the pixel electrode.

The wing may be covered by a light blocking member.

According to an embodiment of the present invention, generation of spots due to coupling between a pixel electrode and a data line in a pixel adjacent to the boundary of a unit pixel may be suppressed or prevented, while an aperture ratio of the curved display panel increases since a light blocking member is differentially applied.

DETAILED DESCRIPTION OF THE EMBODIMENTS

Figure 1:
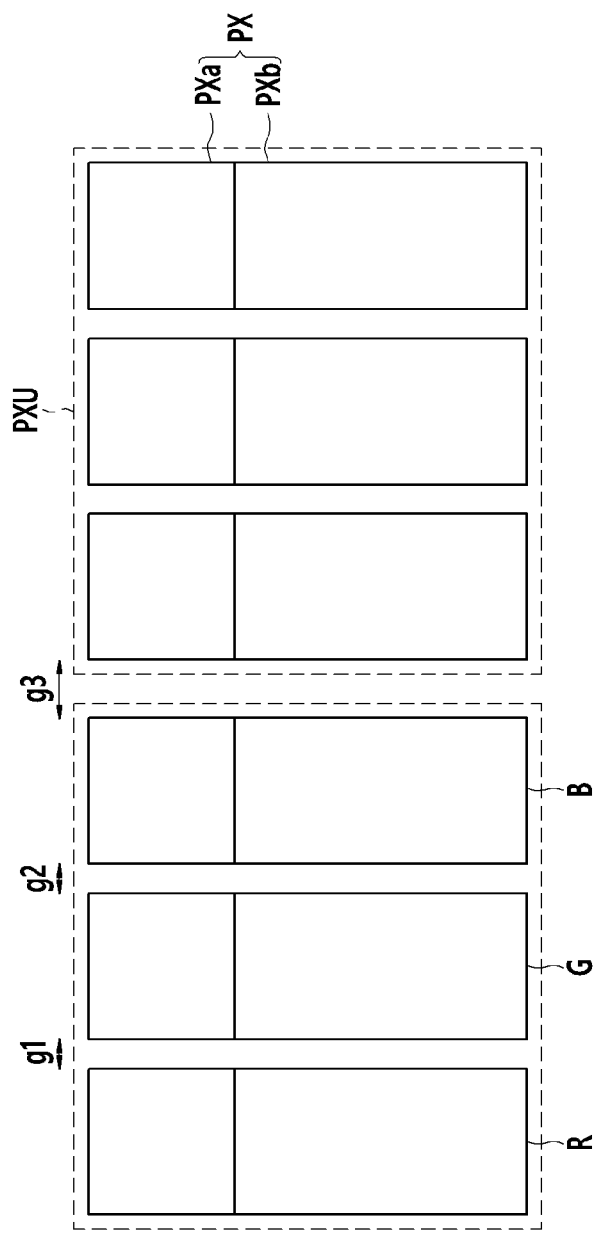
FIG. 1 is a view illustrating a pixel of a liquid crystal display device according to an example embodiment.

Example embodiments will be described more fully hereinafter with reference to the accompanying drawings, in which example embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present. Throughout the specification, "overlap" refers to "overlap viewed in the plan view", unless otherwise mentioned.

A liquid crystal display (LCD) device according to an example embodiment will be described in detail with reference to the accompanying drawings.

Figure 2:
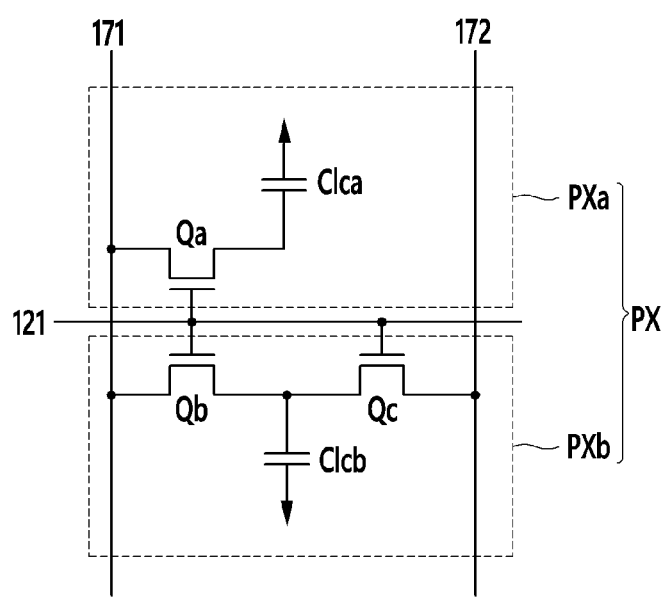
FIG. 2 is an equivalent circuit diagram of a pixel of the LCD device according to an example embodiment.

FIG. 1 is a view illustrating a pixel of a liquid crystal display device according to an example embodiment, and FIG. 2 is an equivalent circuit diagram of a pixel of the LCD device according to an example embodiment.

Referring to FIG. 1, an LCD device according to an example embodiment includes a plurality of pixels PX arranged in a matrix direction. A pixel PX is a minimum unit area used in displaying an image, and one pixel PX may display any one of a set of primary colors used to display an image. For example, one pixel may display any one of a red, green, or blue color, which are three primary colors of light. A pixel is called a red pixel (R), a green pixel (G), or a blue pixel (B) depending on the color displayed by the pixel, and the colored pixels R, G, and B are repeatedly disposed in particular order. In the present disclosure, a set of pixels that includes at least one of each of the three types of colored pixels R, G, and B is called a unit pixel PXU. According to example embodiments, there may also be a pixel displaying a white color (a white pixel W), and the unit pixel may further include the white pixel W.

Pixels PX are disposed at equal gaps within the unit pixel PXU, but are disposed at a larger gap between unit pixels PXU. For example, as illustrated in FIG. 1, when a red pixel R, a green pixel G, and a blue pixel B are disposed in this order, a gap g1 between the red pixel R and the green pixel G and a gap g2 between the green pixel G and the blue pixel B within the unit pixel PXU are equal, while a gap g3 between the blue pixel B and the red pixel R adjacent between neighboring unit pixels PXU is greater than g1 or g2. The arrangement order of the colored pixels R, G, and B is merely illustrative and may be variously modified.

One pixel PX may include a first subpixel PXA and a second subpixel PXB. The first subpixel PXa and the second subpixel PXB may display an image according to different gamma curves with respect to one input image signal, or may display an image according to the same gamma curve. That is, with respect to one input image signal, the first subpixel PXa and the second subpixel PXb of one pixel PX may display images having different brightness to enhance lateral visibility. The first subpixel PXa and the second subpixel PXb may have the same area or different areas. The pixel PX including the first subpixel PXa and the second subpixel PXB may have various circuit structures and dispositions to display an image having different brightness.

Referring to FIG. 2, the LCD device according to an example embodiment includes signal lines such as a gate line 121, a data line 171, and a reference voltage line 172 transmitting a reference voltage, and the like, and a pixel PX connected thereto.

Each pixel PX includes first and second subpixels PXa and PXb. The first subpixel PXa includes a first switching element Qa and a first liquid crystal capacitor Clca, and the second subpixel PXb includes a second and third switching elements Qb and Qc and a second liquid crystal capacitor Clcb. The first switching element Q1 and the second switching element Qb are connected to the gate line 121 and the data line 171, respectively, and the third switching element Qc is connected to an output terminal of the second switching element Qb and the reference voltage line 172. An output terminal of the first switching element Qa is connected to the first liquid crystal capacitor Clca, and the output terminal of the second switching element Qb is connected to the second liquid crystal capacitor Clcb and an input terminal of the third switching element Qc. A control terminal of the third switching element Qc is connected to the gate line 121, an input terminal thereof is connected to the second liquid crystal capacitor Clcb, and an output terminal thereof is connected to the reference voltage line 172.

Referring to an operation of the pixel PX illustrated in FIG. 2, first, when a gate ON voltage is applied to the gate line 121, the first switching element Qa, the second switching element Qb, and the third switching element Qc connected to the gate line 121 are turned on. Thus, a data voltage applied to the data line 171 is applied to the first liquid crystal capacitor Clca and the second liquid crystal capacitor Clcb, respectively, through the first switching element Qa and the second switching element Qb in the turned-on state, and the first liquid crystal capacitor Clca and the second liquid crystal capacitor Clcb are charged by a difference between the data voltage and the common voltage. Here, the same data voltage is transmitted to the first liquid crystal capacitor Clca and the second liquid crystal capacitor Clcb through the first and second switching elements Qa and Qb, but a charge voltage of the second liquid crystal capacitor Clcb is divided by the third switching element Qc. Thus, because the charge voltage of the second liquid crystal capacitor Clcb is smaller than the charge voltage of the first liquid crystal capacitor Clca, luminance of the two subpixels PXa and PXb may be varied. Thus, when the voltage charged in the first liquid crystal capacitor Clca and the voltage charged in the second liquid crystal capacitor Clcb are appropriately adjusted, an image viewed from the side may approximate to an image viewed from the front side. This means that lateral visibility is enhanced.

In the illustrated example embodiment, the third switching element Qc connected to the second liquid crystal capacitor Clcb and the reference voltage line 172 is included to vary the voltage charged in the first liquid crystal capacitor Clca and the voltage charged in the second liquid crystal capacitor Clcb, but any other configuration may be provided according to example embodiments. For example, the second liquid crystal capacitor Clcb may be connected to a step-down capacitor. In detail, a third switching element including a first terminal connected to a step-down gate line, a second terminal connected to the second liquid crystal capacitor Clcb, and a third terminal connected to the step-down capacitor may be included to charge a portion of an amount of an electric charge charged in the second liquid crystal capacitor Clcb to the step-down capacitor, whereby charge voltages of the first liquid crystal capacitor Clca and the second liquid crystal capacitor Clcb may be set to be different. In another example, the first liquid crystal capacitor Clca and the second liquid crystal capacitor Clcb may be connected to different data lines to receive different data voltages, whereby charge voltages of the first liquid crystal capacitor Clca and the second liquid crystal capacitor Clcb may be set to be different. According to example embodiments, a single pixel may not be divided into subpixels.

Hereinafter, the LCD device according to an example embodiment will be described in detail with reference to FIGS. 3, 4 and 5.

Figure 3:
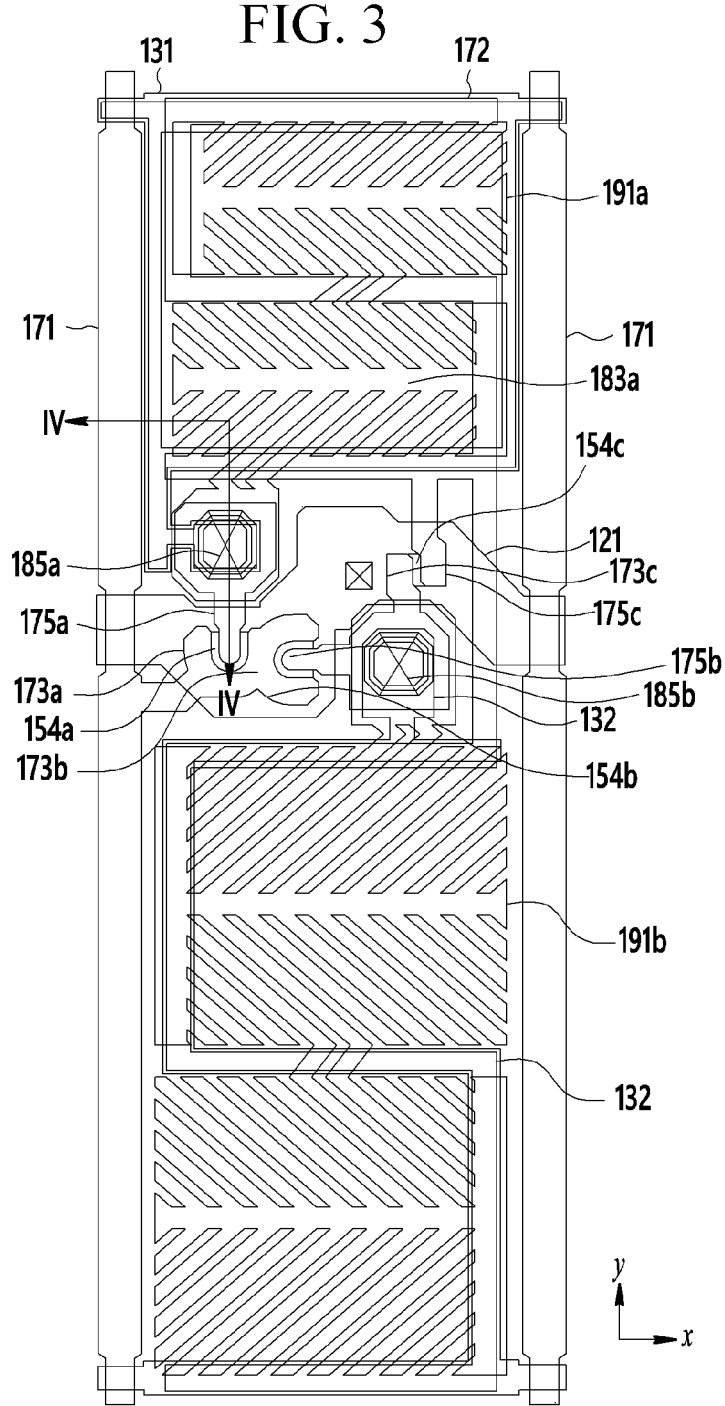
FIG. 3 is a layout view of a pixel of the LCD device according to an example embodiment.
Figure 4:
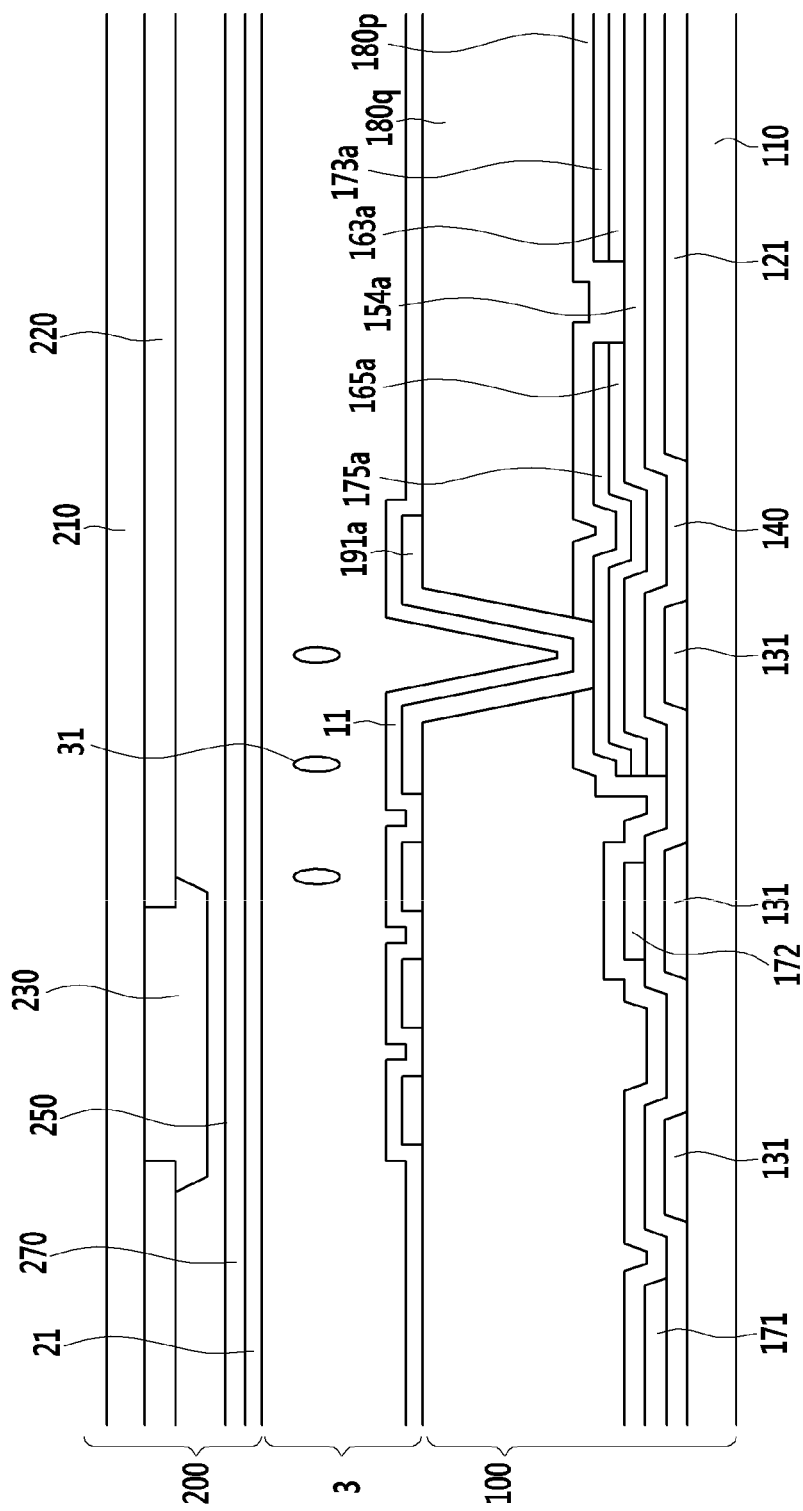
FIG. 4 is a cross-sectional view of the LCD device of FIG. 2, taken along line II-II.
Figure 5:
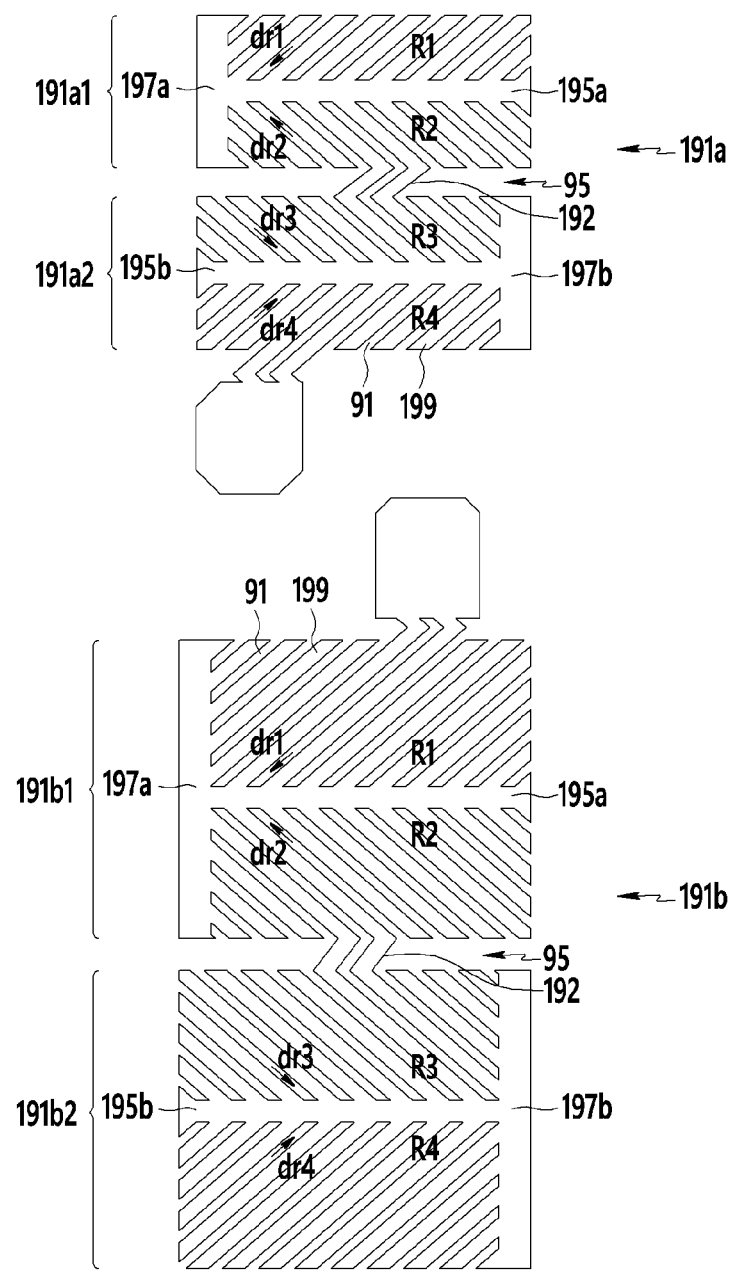
FIG. 5 is a plan view of a subpixel electrode of the LCD device according to an example embodiment.

FIG. 3 is a layout view of a pixel of the LCD device according to an example embodiment, FIG. 4 is a cross-sectional view of the LCD device of FIG. 2, taken along line II-II, and FIG. 5 is a plan view of a subpixel electrode of the LCD device according to an example embodiment.

The LCD device includes a display panel including the lower display substrate 100 and the upper display substrate 200 facing each other, and a liquid crystal layer 3 positioned between the two display substrates 100 and 200. A plurality of pixels PXs are disposed on the display panel.

First, the lower display substrate 100 will be described.

A gate conductor including a gate line 121 and storage electrode lines 131 and 132 is formed on an insulating substrate 110 formed of transparent glass, plastic, and the like.

The gate line 121 includes a large end portion (not shown) for contacting with a gate electrode and any other layer or an external driving circuit. The gate line 121 may be formed of an aluminum-based metal such as aluminum (Al), an aluminum alloy, and the like, a silver-based metal such as silver (Ag), a silver alloy, and the like, a copper-based metal such as copper (Cu), a copper alloy, and the like, a molybdenum-based metal such as molybdenum (Mo), a molybdenum alloy, and the like, chromium (Cr), tantalum (Ta), or titanium (Ti). The gate line 121 may have multilayer structure including at least two conductive films having different physical properties.

The gate line 121 may extend mainly in a horizontal direction and may be formed to traverse one pixel area having a substantially quadrangular shape horizontally. An upper region of the pixel above the gate line 121 is a first subpixel region displaying a high gray level and a lower region of the pixel below the gate line 121 is a second subpixel region displaying a low gray level. The first and second subpixel regions may have a substantially quadrangular shape, and the second subpixel region may be greater than the first subpixel region.

The storage electrode lines 131 and 132 may be formed of the same material as that of the gate line 121, and may be formed through a simultaneous process with the gate line 121.

The storage electrode line 131 above the gate line 121 may have a shape surrounding the first subpixel region in a quadrangular shape. A horizontal portion positioned in the uppermost portion of the storage electrode line 131 having the quadrangular shape may extend, beyond one pixel area, in a horizontal direction so as to be connected to a different layer or an external driving circuit.

The storage electrode line 132 below the gate line 121 may have a shape similar to the digital number 5 in the second subpixel region. For example, the storage electrode line 132 includes three horizontal portions and two vertical portions connecting the three horizontal portions on the edges thereof, and here, the vertical portions connect only one ends of the horizontal portions. When the first horizontal portion and the second horizontal portion are connected by the first vertical portion on the left, the second horizontal portion and the third horizontal portion are connected by the second vertical portion on the right. The third horizontal portion positioned in the lowermost portion of the storage electrode line 132 may extend, beyond one pixel area, in a horizontal direction so as to be connected to a different layer or an external driving circuit. The third horizontal portion of the storage electrode line 132 may be the same as a horizontal portion positioned in the uppermost portion of the storage electrode line 131 of a different pixel area adjacent in a vertical direction.

A gate insulating layer 140 is formed on the gate conductor, and a first semiconductor 154a, a second semiconductor 154b, and a third semiconductor 154c may be formed on the gate insulating layer 140. A plurality of resistive contact members 163a, 165a, 163b, 165b, 163c, and 165c may be formed on the semiconductors 154a, 154b, and 154c. A data conductor including the data line 171 and the reference voltage line 172 is formed on the resistive contact members 163a, 165a, 163b, 165b, 163c, and 165c, and the gate insulating layer 140.

The data conductor includes the data line 171, a first drain electrode 175a, a second drain electrode 175b, and the reference voltage line 172. The data line 171 extends substantially in the vertical direction along one pixel area, and includes a first source electrode 173a and a second source electrode 173b. The reference voltage line 172 includes a third drain electrode 175c. The second drain electrode 175b is connected to a third source electrode 173c, and includes an extending portion.

The reference voltage line 172 may have a shape similar to the digital number 5 in each of the first subpixel region and the second subpixel region. For example, the reference voltage line 172 includes three horizontal portions and two vertical portions connecting the three horizontal portions on the edges thereof, and here, the vertical portions connect only one ends of the horizontal portions. When the first horizontal portion and the second horizontal portion are connected by the first vertical portion on the left, the second horizontal portion and the third horizontal portion are connected on the right. The reference voltage line 172 may have a shape in which the foregoing shape is reversed left and right according to directions of the pixel electrode formed later. That is, the reference voltage line 172 may have a shape of the digital number 5 reversed left to right in each of the first subpixel region and the second subpixel region.

In the reference voltage line 172 positioned in the first subpixel region, a portion of the third horizontal portion positioned in the lowermost portion may be branched to become a third drain electrode 175c.

The first gate electrode 124a, the first source electrode 173a, and the first drain electrode 175a may form one first switching element Qa as a thin film transistor (TFT) together with the first semiconductor 154a, and a channel of the TFT is formed in the first semiconductor 154a part between the first source electrode 173a and the first drain electrode 175a. Similarly, the second gate electrode 124b, the second source electrode 173b, and the second drain electrode 175b form one second switching element Qb together with the second semiconductor 154b, and the third gate electrode 124c, the third source electrode 173c, and the third drain electrode 175c form one third switching element Qc together with the third semiconductor 154c.

A first passivation layer 180p is formed on exposed portions of the data conductor and the semiconductors 154a, 154b, and 154c. The first passivation layer 180p may include an inorganic insulating layer such as a silicon nitride ($SiN_x$) or a silicon oxide ($SiO_x$). When a second passivation layer 180q is a color filter, the first passivation layer 180p may prevent pigment of the color filer 230 from being introduced to the exposed portions of the semiconductors 154a, 154b, and 154c.

The second passivation layer 180q is formed on the first passivation layer 180p. The second passivation layer 180q may be omitted. The second passivation layer 180q may be a color filter. When the second passivation layer 180q is a color filter, the second passivation layer 180q may uniquely display one primary color.

A first contact hole 185a and a second contact hole 185b exposing the first drain electrode 175a and the second drain electrode 175b are formed in the first passivation layer 180p and the second passivation layer 180q, respectively.

A plurality of pixel electrodes 191 may be formed on the second passivation layer 180q, and an alignment layer 11 may be formed on the pixel electrode 191. Each pixel electrode 191 includes a first subpixel electrode 191a and a second subpixel electrode 191b, and the first subpixel electrode 191a and the second subpixel electrode 191b are separated with the gate line 121 interposed therebetween. The pixel electrode 191 may be formed of a transparent conductive material (TCO) such as an indium tin oxide (ITO) or an indium zinc oxide (IZO), or may be formed of a reflective metal such as aluminum (Al), silver (Ag), chromium (Cr), or an alloy thereof. Each pixel electrode 191 is illustrated as being connected to the data line 171 on the left side thereof, but may also be connected to the data line 171 on the right side thereof. The subpixel electrodes 191a and 191b will be described in more detail with reference to FIG. 5.

Although not shown, a shielding electrode may be formed to overlap with the data line 171 along the data line 171 positioned between the pixel electrodes 191 adjacent in the horizontal direction. In this case, when a voltage the same as a voltage applied to a common electrode 270 is applied to the shielding electrode, an electric field is not generated between the shielding electrode and the common electrode 270. The liquid crystal molecules present therebetween are in a vertically aligned state, preventing light leakage between the pixel electrodes 191 and light reflection by the data line 171. The shielding electrode may be formed of a material that is the same as that of the pixel electrode 191 on the second passivation layer 180q.

Hereinafter, the upper display substrate 200 will be described.

A light blocking member 220 formed of transparent glass, plastic, or the like, is formed on an insulating substrate 210. The light blocking member 220 is also called a black matrix and prevents light leakage and light reflection. The light blocking member 220 is formed to overlap with the gate line 121, the switching elements Qa, Qb, and Qc, and the like, in the direction in which the gate line 121 extends. The light blocking member 220 may also be formed to overlap with the data line 171 in the direction in which the data line extends, so as to have a lattice structure having an opening (so that the light blocking member does not cover the first and second subpixel electrodes 191a and 191b) corresponding to the region (namely, the subpixel region) in which light is emitted to display an image. In a case in which the shielding electrode is formed to overlap with the data line 171, the light blocking member 220 extending along the data line 171 may be omitted. The light blocking member 220 may be formed of a material not allowing light to be transmitted therethrough.

A color filter 230 is also formed on the substrate 210. In a case in which the second passivation layer 180q of the lower display substrate 100 is a color filter, the color filter 230 of the upper display substrate 200 may be omitted. The light blocking member 220 of the upper display substrate 200 may also be formed on the lower display substrate 100.

An overcoat 250 may be formed on the color filter 230 and the light blocking member 220 to prevent the color filter 230 from being exposed and provide a flat surface. The overcoat 250 may be omitted. A common electrode 270 is formed on the overcoat 250, and an alignment layer 21 may be formed on the common electrode 270.

The liquid crystal layer 3 positioned between the lower display substrate 100 and the upper display substrate 200 includes liquid crystal molecules 31. The liquid crystal molecules 31 may have negative dielectric anisotropy, and are aligned such that a longer axis thereof is perpendicular to surfaces of the two display substrates 100 and 200 in a state in which an electric field is not generated in the liquid crystal layer 3. The first subpixel electrode 191a and the second subpixel electrode 191b, to which a data voltage is applied, generate an electric field together with the common electrode 270 of the upper display substrate 200, thereby determining orientation of the liquid crystal molecules 31 of the liquid crystal layer 3 between the two electrodes 191 and 270. Luminance of light passing through the liquid crystal layer 3 may vary depending on the determined orientation of the liquid crystal molecules 31.

The first and second subpixel electrodes 191a and 191b will be described in detail with reference to FIG. 5.

The first subpixel electrode 191a has an overall quadrangular shape and includes an upper electrode 191a1 and a lower electrode 191a2 neighboring the upper electrode 191a1 with a gap 95 interposed therebetween. The upper electrode 191a1 and the lower electrode 191a2 may have the substantially same size (in particular, area). The upper electrode 191a1 and the lower electrode 191a2 may be electrically connected through at least one connection portion 192. A connection portion 192 may be formed on the same layer as that of the first subpixel electrode 191a and formed of the same material as that of the first subpixel electrode 191a. As illustrated, the connection portion 192 may be positioned substantially in the center of the first subpixel electrode 191a, or may be positioned substantially in left and/or right edge of the first subpixel electrode 191a.

The upper electrode 191a1 includes at least one horizontal stem portion 195a and at least one vertical stem portion 197a connected thereto. The vertical stem portion 197a mainly extends in a vertical direction, and defines one edge, for example, a left edge, of the upper unit electrode 191a1. The horizontal stem portion 195a may extend, starting from substantially the center of the vertical stem portion 197a, in a horizontal direction substantially perpendicular to the vertical stem portion 197a.

The lower electrode 191a2 may have a shape substantially horizontally symmetrical to the shape of the upper electrode 191a1 in a reversed manner (i.e., the lower electrode 191a2 has substantially the same shape as the upper electrode 191a1 but positioned in a way that is rotated 180 degrees about a center point as compared to upper electrode 191a1). That is, the lower electrode 191a2 includes at least one horizontal stem portion 195b and at least one vertical stem portion 197b connected thereto. The vertical stem portion 197b extends mainly in a vertical direction and defines one edge, for example, a right edge, of the lower unit electrode 191a2. The horizontal stem portion 195b may extend, starting from the substantially center of the vertical stem portion 197b, in a horizontal direction substantially perpendicular to the vertical stem portion 197b.

Lengths of the horizontal stem portions 195a and 195b may be greater than those of the vertical stem portions 197a and 197b.

Each of the horizontal stem portions 195a and 195b may include a portion having a changed width, and the horizontal stem portions 195a and 195b may have the largest width in a position connected to the vertical stem portions 197a and 197b. As for the portion having a changed width of each of the horizontal stem portions 195a and 195b, the width may decrease, starting from the portion connected to the vertical stem portions 197a and 197b, in a direction away from the vertical stem portions 197a and 197b.

Each of the vertical stem portions 197a and 197b may include a portion having a changed width, and the vertical stem portions 197a and 197b may have the largest width in a position connected to the horizontal stem portions 195a and 195b. As for the portion having a changed width of each of the vertical stem portions 197a and 197b, the width may decrease, starting from the portion connected to the horizontal stem portions 195a and 195b, in a direction away from the horizontal stem portions 195a and 195b.

The first subpixel electrode 191a is divided into a plurality of subregions R1, R2, R3, and R4 by the horizontal stem portions 195a and 195b, the vertical stem portions 197a and 197b, and a gap 95. The horizontal stem portions 195a and 195b, the vertical stem portions 197a and 197b, and a gap 95 form boundaries between the neighboring subregions R1, R2, R3, and R4.

The first subpixel electrode 191a includes a plurality of fine branch portions 199 formed in each of the subregions R1, R2, R3, and R4. The fine branch portions 199 may slantingly extend outwardly from the horizontal stem portions 195a and 195b or the vertical stem portions 197a and 197b. Fine slits 91 are positioned between neighboring fine branch portions 199, from which the electrodes have been removed.

The fine branch portions 195 of the different subregions R1, R2, R3, and R4 of one first subpixel electrode 191a may extend in different directions. In particular, the fine branch portions 199 of the adjacent subregions R1, R2, R3, and R4 on opposite sides of horizontal stem portions 195a and 195b or gap 95 may be at an angle about 90 degrees or 180 degrees. In each of the subregions R1, R2, R3, and R4, the directions in which the fine branch portions 199 extend may be uniform. In detail, among the subregions R1 and R2 defined by the horizontal stem portion 195a and the vertical stem portion 197a, the fine branch portions 199 of the upper subregion R1 may extend right upwardly from the horizontal stem portion 195a or the vertical stem portion 197a, and the fine branch portions 199 of the lower subregion R2 may extend right downwardly from the horizontal stem portion 195a or the vertical stem portion 197a. Also, among the subregions R3 and R4 defined by the horizontal stem portion 195b and the vertical stem portion 197b, the fine branch portions 199 of the upper subregion R3 may extend left upwardly from the horizontal stem portion 195b or the vertical stem portion 197b, and the fine branch portions 199 of the lower subregion R4 may extend left downwardly from the horizontal stem portion 195b or the vertical stem portion 197b. A portion of the fine branch portions 199 of the subregion R4 is connected to an extending portion of the first subpixel electrode 191a to receive a voltage from the first drain electrode 175a connected through the first contact hole 185a (please refer to FIGS. 1 and 2).

The second subpixel electrode 191b may have a size different from that of the first subpixel electrode 191a, and may have the substantially same structure as that of the first subpixel electrode 191a. Thus, the description of the first subpixel electrode 191a will replace a detailed description of the second subpixel electrode 191b.

Referring to FIGS. 3 through 5, a liquid crystal layer 3 positioned in one pixel PX includes a plurality of domains in which directions in which the liquid crystal molecules 31 are tilted are different when an electric field is generated in the liquid crystal layer 3, thereby achieving a wide viewing angle. The directions in which the liquid crystal molecules 31 are tilted may be uniform in each domain, and the particular direction may be referred to as a behavior direction of the liquid crystal molecules 31. In this disclosure, a behavior direction of the liquid crystal molecules 31 in each domain may be referred to simply as a domain direction.

In one pixel PX, domains of the liquid crystal layer 3 may correspond to a plurality of subregions R1 to R4 of the first subpixel electrode 191a and the plurality of subregions R1 to R4 of the second subpixel electrode 191b, respectively. For example, in a case in which a pixel electrode includes eight subregions, namely, four subregions R1 to R4 of the first subpixel electrode 191a and four subregions R1 to R4 of the second subpixel electrode 191b, the liquid crystal layer 3 corresponding thereto may have eight domains in each pixel PX.

For a fast response speed, the liquid crystal molecules 31 of each domain may be initially aligned at a pretilt angle in each behavior direction in a state in which an electrical field is not present in the liquid crystal layer 3. In this manner, in order to allow the liquid crystal molecules 31 to have a pretilt angle at an initial stage, an alignment layer having several orientation directions may be used, or the liquid crystal layer 3 or the alignment layer may include an alignment assistant for pretilting of the liquid crystal molecules 31. In a case in which the alignment layer forms pretilting of the liquid crystal molecules 31, light such as ultraviolet ray may be slantingly irradiated to control an initial orientation direction and an orientation angle of the liquid crystal molecules 31. In one pixel, directions in which liquid crystal molecules 31 are tilted are different in each domain, and thus, pretilt directions are also different in each domain.

Operations of the LCD device according to an example embodiment will be described with reference to FIGS. 3 through 5.

When a gate ON voltage is applied to the gate electrodes of the switching elements Qa and Qb to turn on the switching elements Qa and Qb, a data voltage is applied to the first and second subpixel electrodes 191a and 191b. The first and second subpixel electrodes 191a and 191b, to which the data voltage has been applied, and the common electrode 270 to which a common voltage has been applied, generate an electric field together in the liquid crystal layer 3.

The electric field includes a vertical component substantially perpendicular to the surfaces of the display substrates 100 and 200, and the liquid crystal molecules 31 tend to be tilted in a direction substantially parallel to the surfaces of the display substrates 100 and 200 by the vertical component of the electric field. A fringe field is formed between the edges of the fine branch portions 199 and the horizontal stem portions 195a and 195b and the vertical stem portions 197a and 197b of the first and second subpixel electrodes 191a and 191b and the common electrode 270, and thus, the liquid crystal molecules 31 are substantially tilted toward the connection portions of the horizontal stem portions 195a and 195b and the vertical stem portions 197a and 197b and in a direction substantially parallel to a length direction of the fine branch portions 199. Thus, a plurality of domains in which directions in which the liquid crystal molecules 31 are tilted are different are formed in the liquid crystal layer 3 of one pixel PX. In this manner, the means for controlling the liquid crystal molecules 31 of the liquid crystal layer 3 to be tilted in different directions is called a domain dividing unit.

Referring to FIG. 5, the liquid crystal molecules 31 corresponding to the subregion R1 is tilted substantially in a first direction dr1, and the liquid crystal molecules 31 corresponding to the subregion R2 is tilted substantially in a second direction dr2. The liquid crystal molecules 31 corresponding to the subregion R3 is tilted substantially in a third direction dr3, and the liquid crystal molecules 31 corresponding to the subregion R4 is tilted substantially in a fourth direction dr2. The first to fourth directions dr1 to dr4 are behavior directions of the liquid crystal molecules 31. For example, at a left viewing angle, the domains in which the liquid crystal molecules 31 are tilted in the first and second directions dr1 and dr2 are mainly visible, and at the right viewing angle, the domains in which the liquid crystal molecules 31 are tilted in the third and fourth directions dr3 and dr4 are mainly visible. Of course, in the front, all the domains are visible regardless of domain direction. Visualized viewing angles of a pair of domains in the first and second directions and a pair of domains in the third and fourth directions are different on left and right sides thereof, it may be expressed that the directions dr1 and dr2 of the pair of first and second domains and the directions dr3 and dr4 of the pair of third and fourth domains are staggered.

Figure 6:
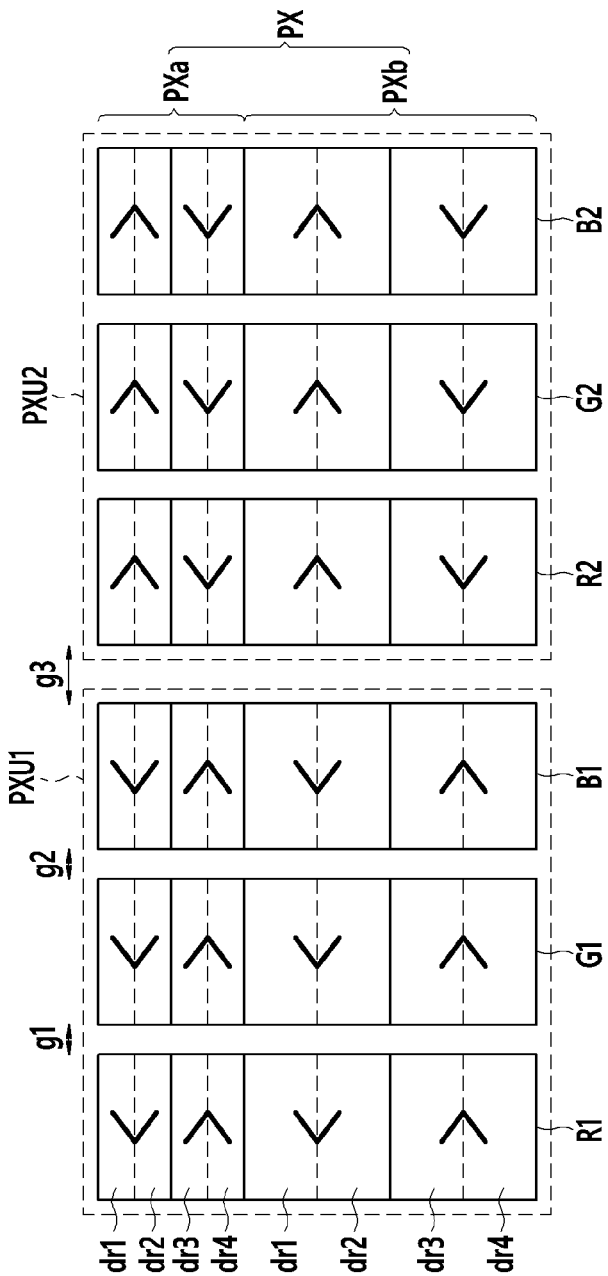
FIG. 6 is a view illustrating domain directions in adjacent pixels of the LCD device according to an example embodiment.

FIG. 6 is a view illustrating domain directions in adjacent pixels of the LCD device according to an example embodiment.

Likewise as in FIG. 1, it illustrated that three pixels PX form each of unit pixels PXU1 and PXU2 and six pixels PX are adjacent in the horizontal direction. Each of the pixels PX includes a first subpixel PXa and a second subpixel PXb, and each of the first and second subpixels PXa and PXb is divided into four domains.

In the first unit pixel PXU1, the pixels PX are arranged in order of a red pixel R1, a green pixel G1, and a blue pixel B1 from the left. The pixels PX of the first unit pixel PXU1 have the same domain direction. For example, when the red pixel R1 has the foregoing domain directions dr1 to dr4, the green pixel G1 and the blue pixel B1 have the same domain directions dr1 to dr4.

In the second unit pixel PXU2 adjacent to the first unit pixel PXU1, the pixels PX are arranged in order of a red pixel R2, a green pixel G2, and a blue pixel B2 from the left. The pixels PX of the second unit pixel PXU2 have the same domain direction. However, the pixels PX of the second unit pixel PXU2 have domain directions different from those of the pixels PX of the first unit pixel PXU1. That is, the pixels PX of the two adjacent unit pixels PXU1 and PXU2 have domain directions symmetrical with respect the boundary of two unit pixels PXU1 and PXU2.

In a case in which a display panel is a curved display panel, the lower display substrate 100 and the upper display substrate 200 have different curvatures. Thus, if the domain directions of adjacent pixels are different, pretilting directions of the lower display substrate 100 and the upper display substrate 200 are changed, generating texture (a dark portion) in both left and right end portions of the pixels. Thus, such texture is suppressed or covered by increasing a gap between pixels and expanding the light blocking member 220 overlapping with the data line 171 between mutually adjacent pixels. However, as in the example embodiment of the present disclosure, when the domain directions of the pixels of the unit pixels PXU1 and PXU2 are the same, because the pretilting directions of the pixels are not different, the generation of texture is reduced. Thus, the width of the light blocking member 220 overlapping with the data line 171 may be reduced and the gap between adjacent pixels may be reduced, whereby an aspect ratio may increase to increase transmission efficiency.

However, the two pixels B1 and R2 adjacent to the boundary between the two neighboring unit pixels PXU1 and PXU2 have different domain directions, so it is necessary to expand the light blocking member 220 overlapping with the data line 171. Thus, gaps g1 and g2 between the pixels within the unit pixels PXU1 and PXU2 are smaller than the gap g3 between the pixels within the unit pixels PXU1 and PXU2, and a width of the light blocking member 220 between the pixels within the unit pixels PXU1 and PXU2 is smaller than a width of the light blocking member between the unit pixels PXU1 and PXU2.

In the case in which the domain directions of pixels are the opposite in every unit pixel PXU1 and PXU2 (which is called a unit pixel stagger structure), the gaps g1 and g2 between the pixels within the unit pixels PXU1 and PXU2 and the gap g3 between the pixels B1 and R2 adjacent to the boundary between the unit pixels PXU1 and PXU2 are different. Thus, in the pixels B1 and R2 adjacent to the boundary between the unit pixels PXU1 and PXU2, a gap between the pixel electrode and the data line on the left side thereof and a gap between the pixel electrode and the data line on the right side thereof may be different. Thus, capacitance between the pixel electrode and the data lines is formed to be different on the left side and the right side of the pixel electrode and a pixel voltage is affected by fluctuation in a data voltage due to the coupling based on the different capacitances. When the pixel voltage is changed according to an influence of the data voltage, spots may be generated and image quality may be degraded.

Thus, the present disclosure provides several schemes for making the gaps between the pixel electrode and the data lines equal. In a case in which the gaps between the pixel electrode and the data lines equal on both sides of the pixel electrode, capacitance between the pixel electrode and data lines on both sides of the pixel electrode may be the same, and thus, coupling effect due to both capacitance may be canceled out, preventing generation of spots.

FIGS. 7 through 12 are views illustrating dispositions of pixel electrodes and data lines according to some example embodiments.

Figure 7:
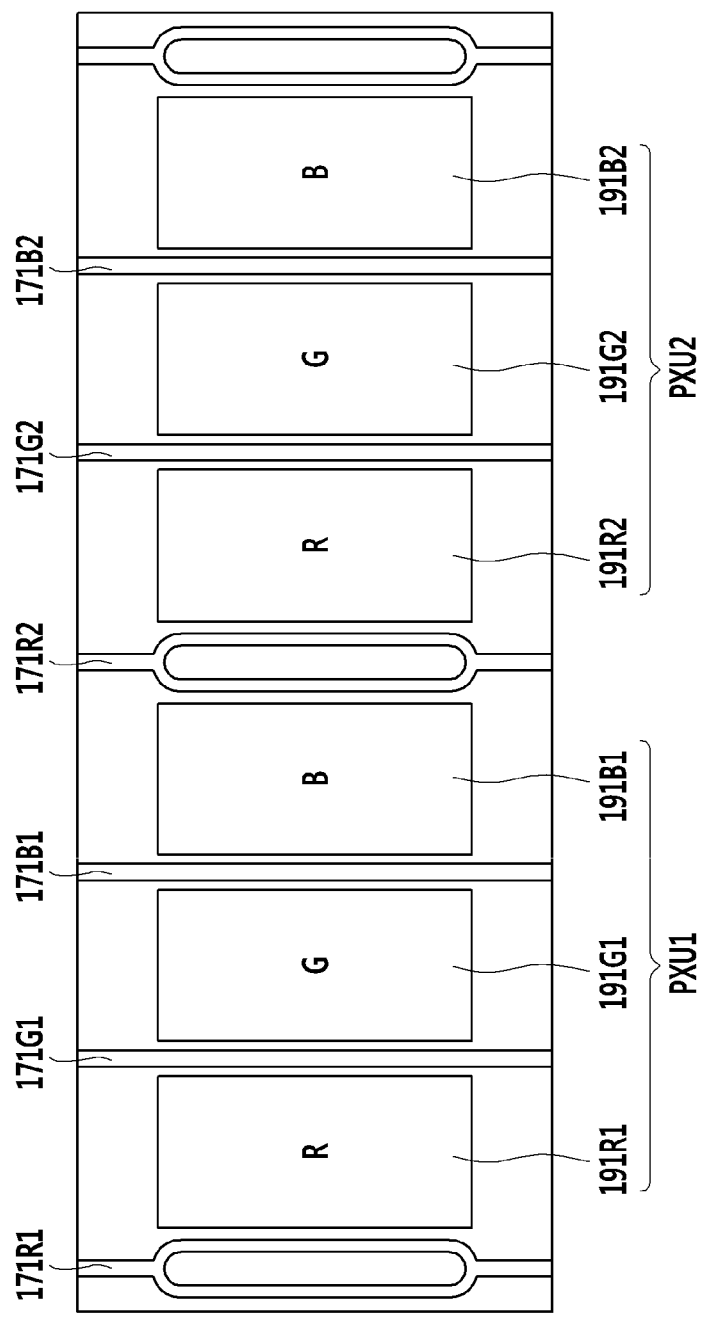
FIGS. 7, 8, 9, 10, 11 and 12 are views illustrating dispositions of pixel electrodes and data lines according to some example embodiments.

Referring to FIG. 7, only pixel electrodes and data lines in two unit pixels PXU1 and PXU2 adjacent in a horizontal direction are schematically illustrated. As described above, each pixel electrode may include a first subpixel electrode and a second subpixel electrode, and each subpixel electrode may be patterned to have a horizontal stem portion, a vertical stem portion, fine branch portions, and the like, and here, each pixel electrode is briefly illustrated as having a quadrangular shape.

Gaps between pixel electrodes 191R1, 191G1, 191B1; 191R2, 191G2, and 191B2 within the unit pixels PXU1 and PXU2 are equal, and data lines 171G1, 171B1; 171G2, and 171B2 positioned in the gaps between the pixel electrodes extend as a single body, individually and substantially linearly such as in a general LCD device. A gap between the pixel electrodes 191B1 and 191R2 adjacent to the boundary of the neighboring unit pixels PXU1 and PXU2 is larger than the gaps between the pixel electrodes within the unit pixels. Such characteristics are the same even in the example embodiment of FIGS. 8 through 12.

As illustrated in FIG. 7, the data line 171R2 positioned between the unit pixels PXU1 and PXU2, namely, between the pixel electrodes 191B1 and 191R2, is formed like a vertically elongated ring. That is, the data line 171R2 extends as one body in substantially upper and lower sides of the pixel electrodes 191B1 and 191R2 in a vertical direction, but bifurcates (like a U-shape) to form two lines in parallel between the pixel electrodes 191B1 and 191R2.

When the data line 171R2 is formed in this manner, because the width of the data line 171R2 increases, distances between the data line 171R2 and the pixel electrodes 191B1 and 191R2 may be reduced. According to the example embodiment, by appropriately adjusting the width of the data line 171R2, the distances between the pixel electrodes 191B1 and 191R2 and the data lines 171B1 and 171R2 on the left side thereof and the distances between the pixel electrodes 191B1 and the 191R2 and the data lines 171R2 and 171G2 on the right side thereof may be substantially equal, and thus, capacitance generated with the data lines on both sides can be substantially equal, preventing generation of spots due to non-uniform coupling on both sides of the pixel electrodes 191B1 and 191R2.

In a case in which the data line 171R2 is formed as a single linear line like the other data lines 171G1, 171B1, 171G2, and 171B2, because the gap between the pixel electrodes 191B1 and 191R2 is large, and thus, a distance to at least one of the pixel electrodes 191B1 and 191R2 may inevitably become relatively distant. Then, capacitances generated with the data lines on both sides are different due to the difference in the distances between at least one of the pixel electrodes 191B1 and 191R2 and the data lines 171B1 and 171R2 on the left side thereof and the data lines 171R2 and 171G2 on the right side thereof, and as a result, a pixel voltage is changed by a data voltage due to the non-uniform coupling, generating spots.

Figure 8:
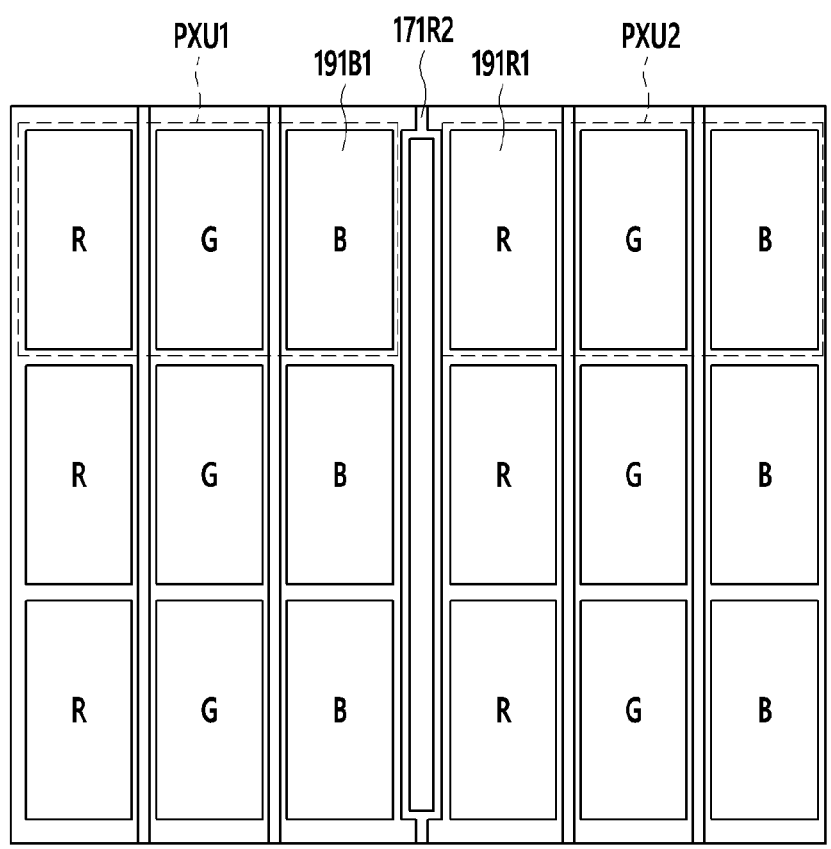
Figure 9:
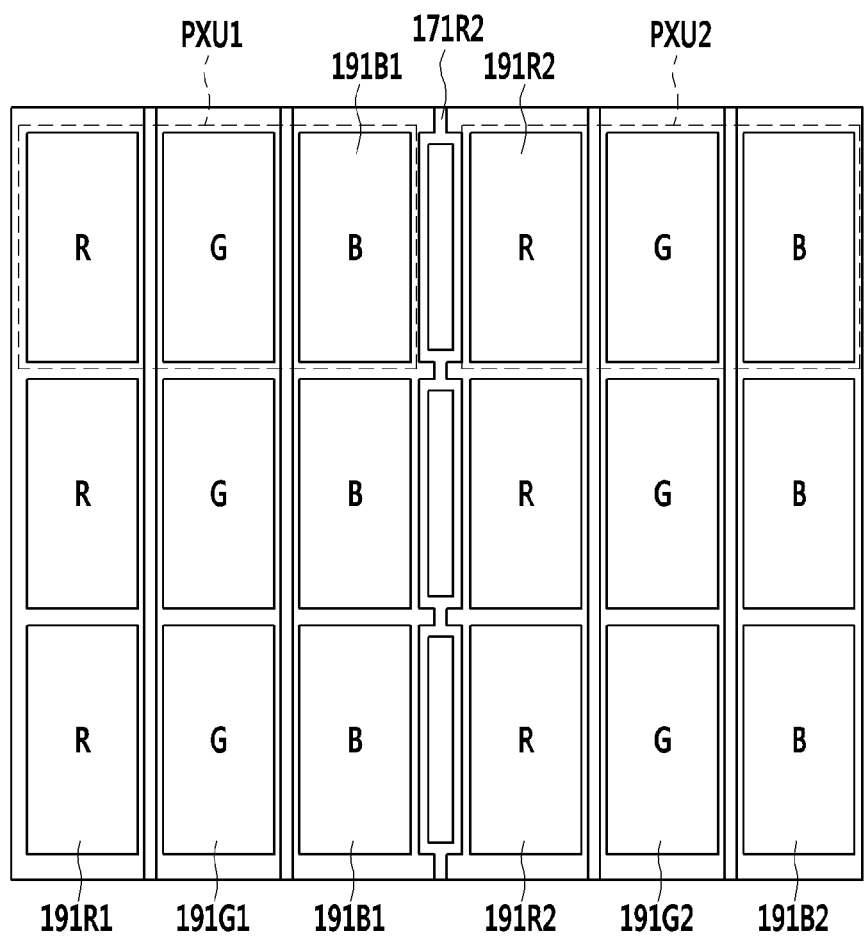
Figure 10:
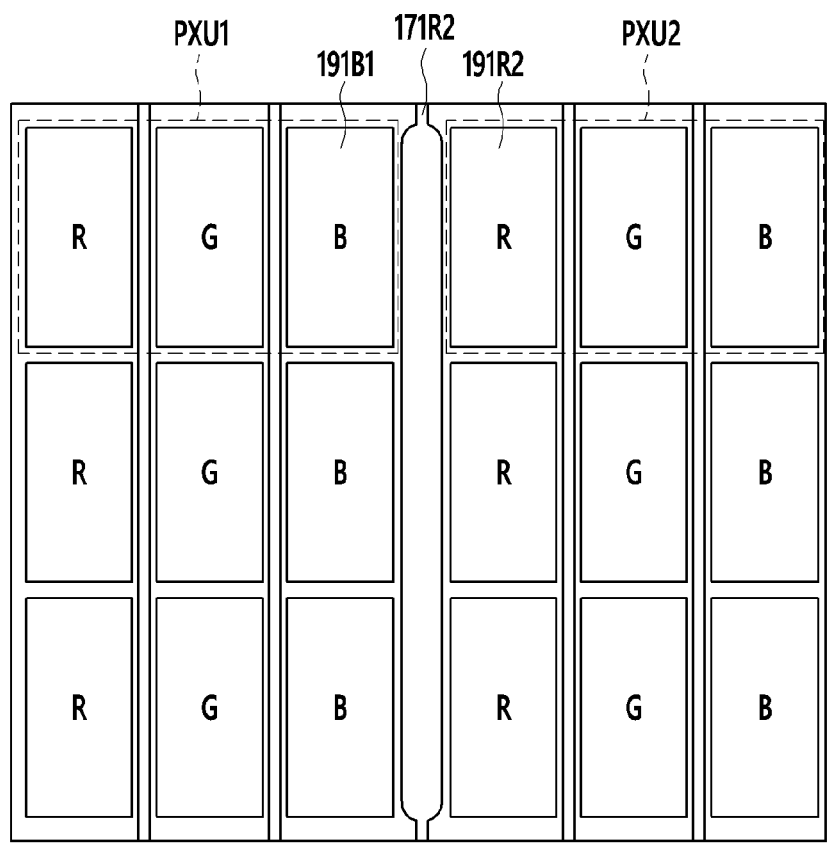

FIGS. 8 through 10 illustrate modified examples of the data line 171R2 positioned between the neighboring unit pixels PXU1 and PXU2.

Referring to FIG. 8, the data line 171R2 includes a quadrangular ring which is elongated in a vertical direction and hollow in a center area. Compared with the example embodiment of FIG. 7 in which both ends of the ring are rounded, the present example embodiment is slightly different in that both ends of the ring are angular. In this manner, even though the data line 171R2 is formed as a quadrangular ring, the width of the data line 171R2 is large so as to reduce distances to the pixel electrodes 191B1 and 191R2 on both sides of the data line 171R2, thus preventing generation of spots due to non-uniform coupling. The quadrangular ring may be continuously formed across the plurality of pixels in the vertical direction, or alternatively, as illustrated in FIG. 9, a quadrangular ring may be formed to be discontinuous at every portion between the pixels in a vertical direction. That is, the data lines 171R2 may be formed like connected chains.

Referring to FIG. 10, a data line 171R2 is formed as a solid body, unlike the previous example embodiment in which the data line 171R2 is formed as a hollow ring shape. That is, the data line 171R2 present between the unit pixels PXU1 and PXU2 has a width larger than those of the data lines 171G1, 171B1, 171G2, and 171B2 of the unit pixels PXU1 and PXU2 and is not hollow in a center region. The portions having a large width may be present across the plurality of pixels in a vertical direction, or may be formed between pixels in the vertical direction like a Vienna sausage. Because the data line 171R2 has a large width, distances to the pixel electrodes 191B1 and 191R2 adjacent thereto may be reduced, improving non-uniformity of capacitance with the data lines on both sides of the pixel electrodes 191B1 and 191R2.

Figure 11:
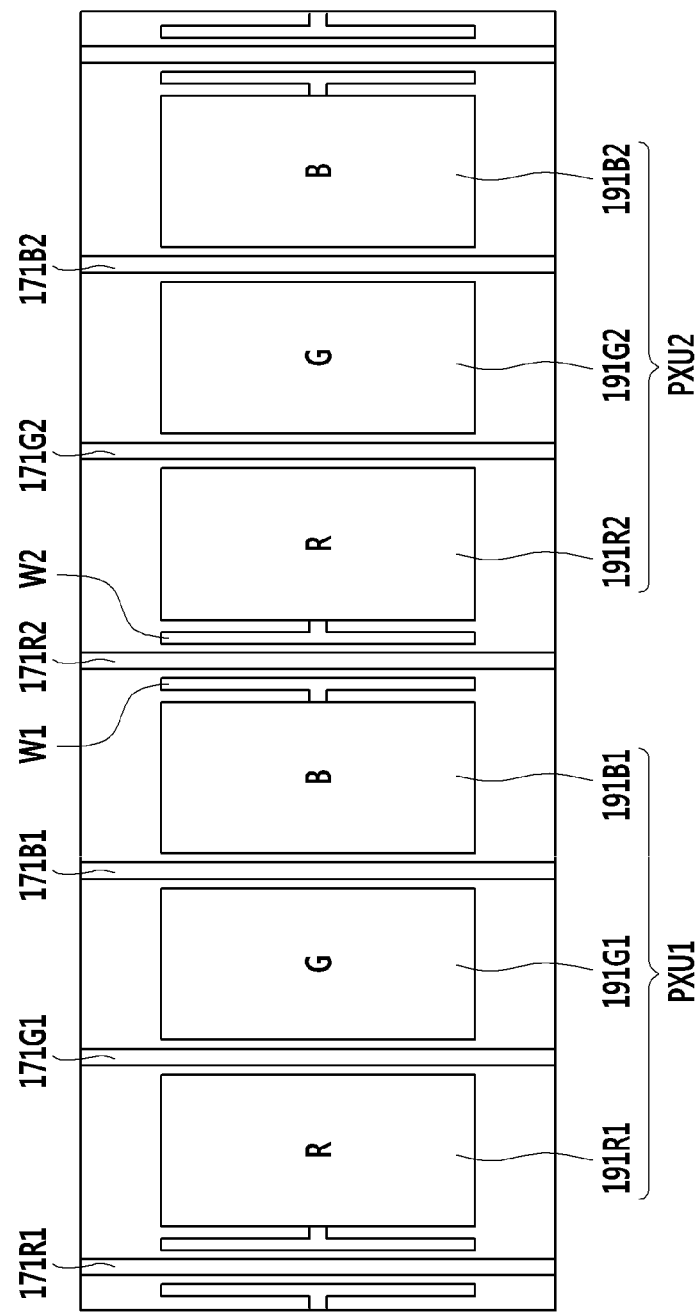
Figure 12:
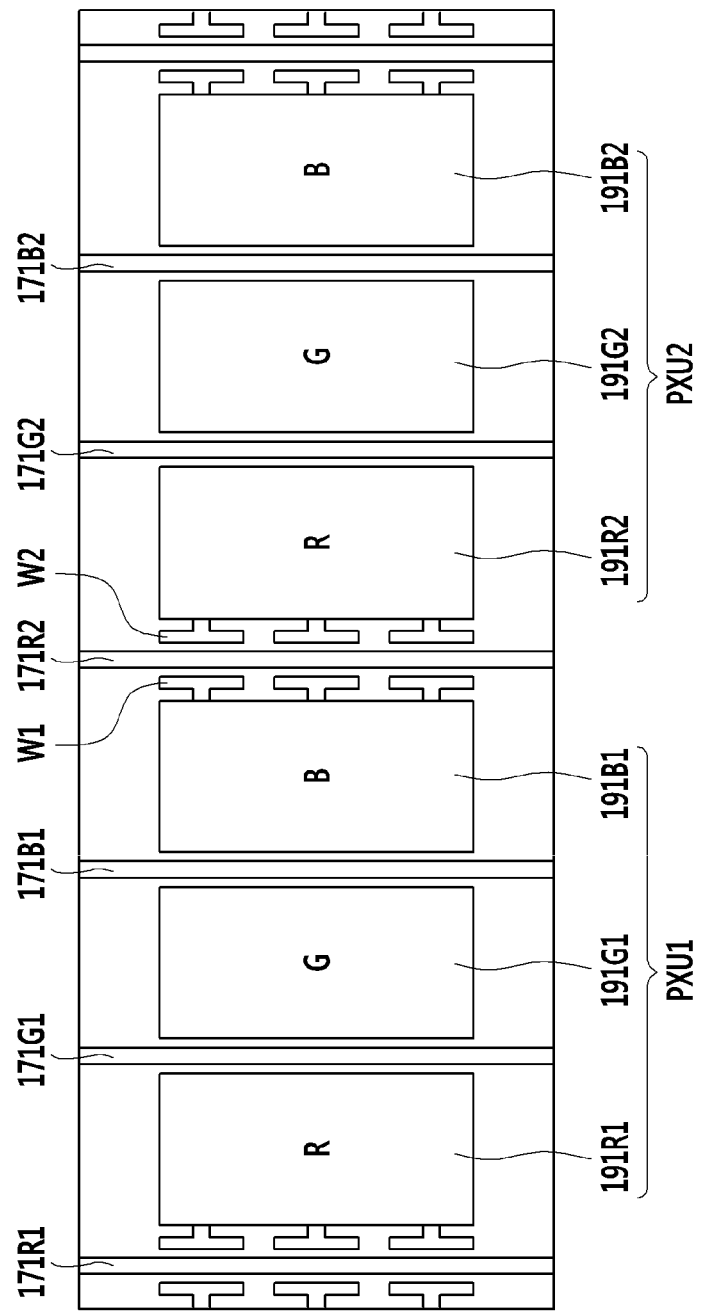

In FIGS. 11 and 12, the data line 171R2 between neighboring unit pixels PXU1 and PXU2 is formed to be the same as data lines 171G1, 171B1, 171G2, and 171B2 between the pixel electrodes within the unit pixels PXU1 and PXU2. That is, even the data line 171R2, as well as the data lines 171G1, 171B1, 171G2, and 171B2, extend as linear lines overall. Here, a distance between the pixel electrode 191B1 and the data line 171B1 on the left side thereof and a distance between the pixel electrode 191B1 and the data line 171R2 on the right side thereof are different. A distance between the pixel electrode 191R2 and the data line 171R2 on the left side thereof and a distance between the pixel electrode 191R2 and the data line 171G2 on the right side thereof are also different.

In order to remove the effect of the difference in distances, a wing W1 is electrically connected to the right side of the pixel electrode 191B1. The wing W1 may be formed to be parallel to the pixel electrode 191B1 at a predetermined distance, except for the portion thereof connected to the pixel electrode 191B1, have a length substantially the same as that of the pixel electrode 191B1, and formed to also be parallel to the data line 171R2. A distance between the wing W1 and the data line 171R2 and a distance between the pixel electrode 191B1 and the data line 171B1 may be substantially the same, whereby capacitance with the data lines 171B1 and 171R2 on both sides of the pixel electrode 191B1 may be substantially the same, thus preventing generation of spots.

Similarly, a wing W2 is electrically connected to the right side of the pixel electrode 191R2. The wing W2 may be formed to be parallel to the pixel electrode 191R2 at a predetermined distance, except for the portion thereof connected to the pixel electrode 191R2, have a length substantially the same as that of the pixel electrode 191R2, and formed to also be parallel to the data line 171R2. A distance between the wing W2 and the data line 171R2 and a distance between the pixel electrode 191G2 and the data line 171G2 may be substantially the same, whereby capacitance with the data lines 171R2 and 171G2 on both sides of the pixel electrode 191R2 may be substantially the same. The wing W2 may be formed to be symmetrical with the wing W1 with respect to the data line 171R2.

The wings W1 and W2 may be formed as only one in the pixel electrodes 191B1 and 191R2 as illustrated in FIG. 11, or a plurality of wings W1 and W2 may be connected to each of the pixel electrodes 191B1 and 191R2 as illustrated in FIG. 12.

The wings W1 and W2 may be formed together with the pixel electrodes 191B1 and 191R2 when the pixel electrodes 191B1 and 191R2 are formed. Because the wings W1 and W2 are electrically connected to the pixel electrodes 191B1 and 191R2, a data voltage applied to the pixel electrodes 191B1 and 191R2 may also be applied to the wings W1 and W2 to generate light leakage or texture. Thus, the portions where the wings W1 and W2 are present may be covered by the light blocking member 220 positioned in the upper display substrate 200 or the lower display substrate 100 and the light blocking member 220 may be a light blocking member extending from the light blocking member 220 overlapping with the data line 171R2.

Figure 13:
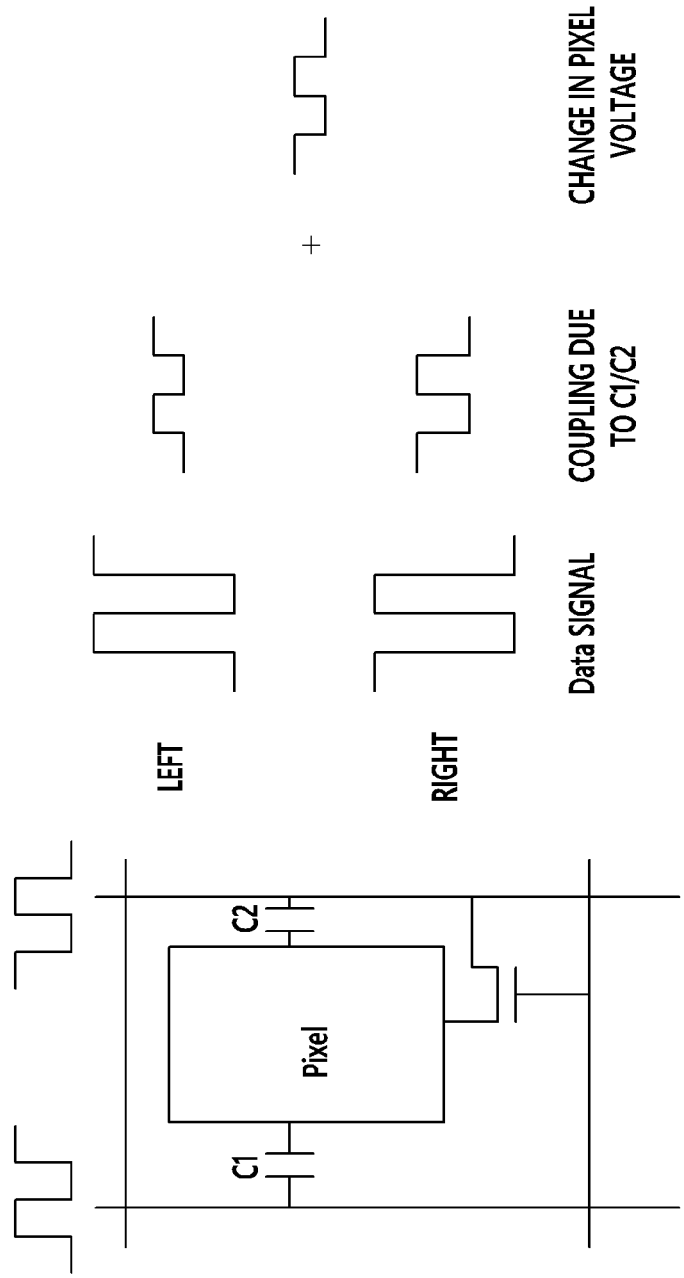
FIGS. 13 and 14 are views illustrating a change in a pixel voltage according to capacitance with data lines on both sides of a pixel electrode.
Figure 14:
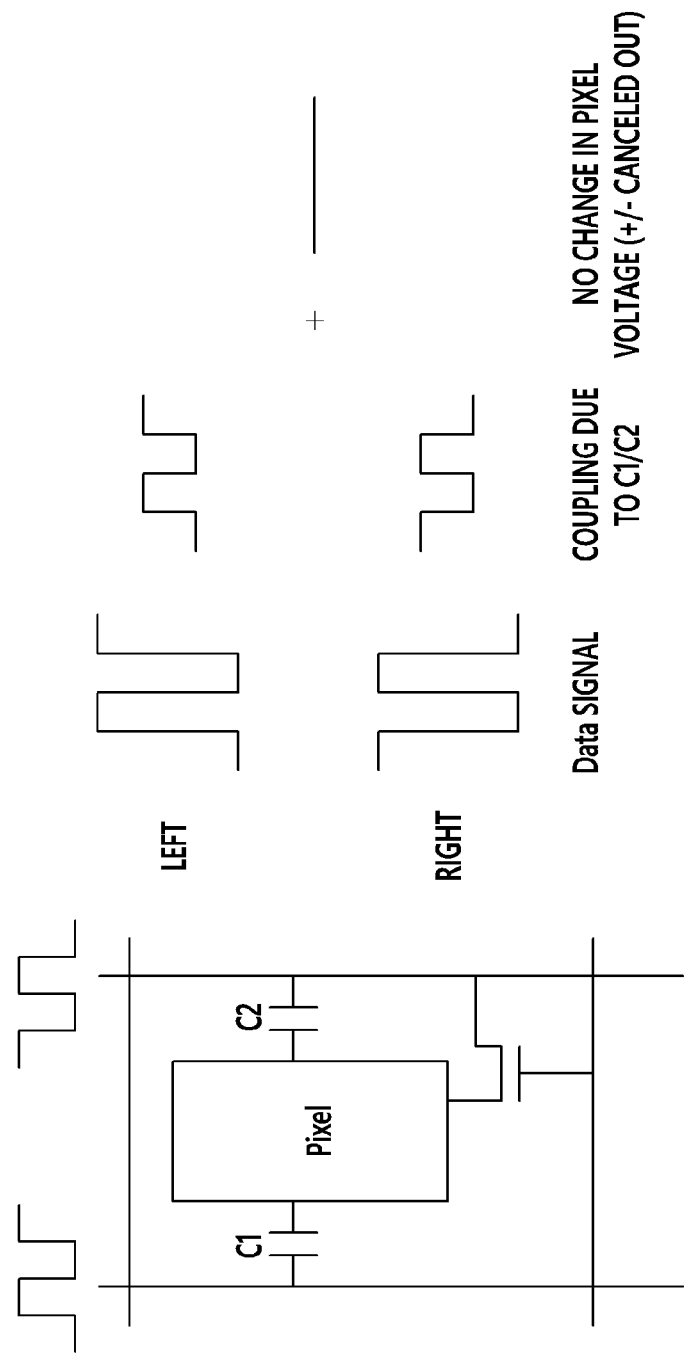

FIGS. 13 and 14 are views illustrating a change in a pixel electrode according to capacitance with data lines on both sides of a pixel electrode.

Referring to FIG. 13, a distance between the pixel electrode and a left data line is greater than a distance between the pixel electrode and a right data line. As a result, capacitance C1 between the pixel electrode and the left data line is smaller than capacitance C2 between the pixel electrode and the right data line. Here, when signals having the mutually opposite polarities are applied to the left data line and the right data line, coupling due to the capacitance C2 is greater than coupling due to the capacitance C1. Thus, couplings on both sides of the pixel electrode are not uniform, and thus, a pixel voltage is changed due to a data signal applied to the both data lines.

Referring to FIG. 14, when a distance between the pixel electrode and the left data line and a distance between the pixel electrode and the right data line are equal, capacitance C1 between the pixel electrode and the left data line and capacitance C2 between the pixel electrode and the right data line may be the same. In this case, when signals having the mutually opposite polarities are applied to the left data line and the right data line, because coupling due to capacitance C1 and coupling due to capacitance C1 are the same, the two coupling effects are canceled out. As a result, because a pixel voltage is not changed, a degradation of image quality such as spots, or the like, due to coupling may not be generated.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A liquid crystal display device comprising:
a display panel including:
a lower display substrate on which a plurality of pixel electrodes are disposed in a matrix and data lines extend in a column direction between adjacent pixel electrodes;
an upper display substrate on which a common electrode is disposed; and
a liquid crystal layer disposed between the lower display substrate and the upper display substrate and including liquid crystal molecules,
wherein the display panel includes a plurality of unit pixels, each unit pixel including pixels having different colors, and each pixel including one pixel electrode of the plurality of pixel electrodes,
a gap between neighboring unit pixels is larger than a gap between neighboring pixel electrodes within each unit pixel, and
a data line positioned between the neighboring unit pixels has a portion having a width larger than that of a data line positioned between the neighboring pixel electrodes within each unit pixel.

2. The liquid crystal display device of claim 1, wherein:
a distance between a left data line and a pixel electrode adjacent to the data line positioned between the neighboring unit pixels and a distance between a right data line and the pixel electrode are substantially equal.

3. The liquid crystal display device of claim 1, wherein:
the portion having a larger width of the data line positioned in the boundary between the neighboring unit pixels has a ring shape with both ends rounded.

4. The liquid crystal display device of claim 1, wherein:
the portion having a larger width of the data line positioned in the boundary between the neighboring unit pixels has a ring shape with both ends angular.

5. The liquid crystal display device of claim 1, wherein:
the portion having a larger width of the data line positioned in the boundary between the neighboring unit pixels is formed as a solid body.

6. The liquid crystal display device of claim 1, wherein:
the portion having a larger width of the data line positioned in the boundary between the neighboring unit pixels is continuously formed across the plurality of pixel electrodes in a column direction.

7. The liquid crystal display device of claim 1, wherein:
the portion having a larger width of the data line positioned in the boundary between the neighboring unit pixels is formed to be discontinuous at every portion between the pixels in a column direction.

8. The liquid crystal display device of claim 1, wherein:
each pixel electrode includes a first subpixel electrode and a second subpixel electrode,
each of the first and second subpixel electrodes includes a plurality of subregions in which tilting directions of liquid crystal molecules are differently controlled, and
directions in which the liquid crystal molecules are controlled are substantially the same in the corresponding subregions of the pixel electrodes within each unit pixel.

9. The liquid crystal display device of claim 8, wherein:
directions in which the liquid crystal molecules are controlled are substantially opposite in corresponding subregions of the pixel electrodes adjacent to the boundary between the neighboring unit pixels.

10. The liquid crystal display device of claim 8, wherein:
the first subpixel electrode includes first, second, third, and fourth subregions sequentially from an upper side, and
a direction in which the liquid crystal molecules are controlled in the first and second subregions and a direction in which the liquid crystal molecules are controlled in the third and fourth subregions are substantially opposite.

11. The liquid crystal display device of claim 10, wherein:
the second subpixel electrode includes first, second, third, and fourth subregions sequentially from an upper side, and
a direction in which the liquid crystal molecules are controlled in the first and second subregions and a direction in which the liquid crystal molecules are controlled in the third and fourth subregions are substantially opposite.

12. The liquid crystal display device of claim 11, wherein:
a direction in which the liquid crystal molecules are controlled in the first and second subregions of the first subpixel electrode and a direction in which the liquid crystal molecules are controlled in the first and second subregions of the second subpixel electrode are substantially the same.

13. The liquid crystal display device of claim 8, wherein:
each of the first subpixel electrode and the second subpixel electrode includes an upper electrode and a lower electrode connected to each other,
each of the upper electrode and the lower electrode includes a horizontal stem portion, a vertical stem portion, and a plurality of fine branch portions slantingly extending from the horizontal stem portion or the vertical stem portion, and
the horizontal stem portion forms the boundary between two neighboring subregions.

* * * * *